United States Patent Office 2,802,171
Patented Aug. 6, 1957

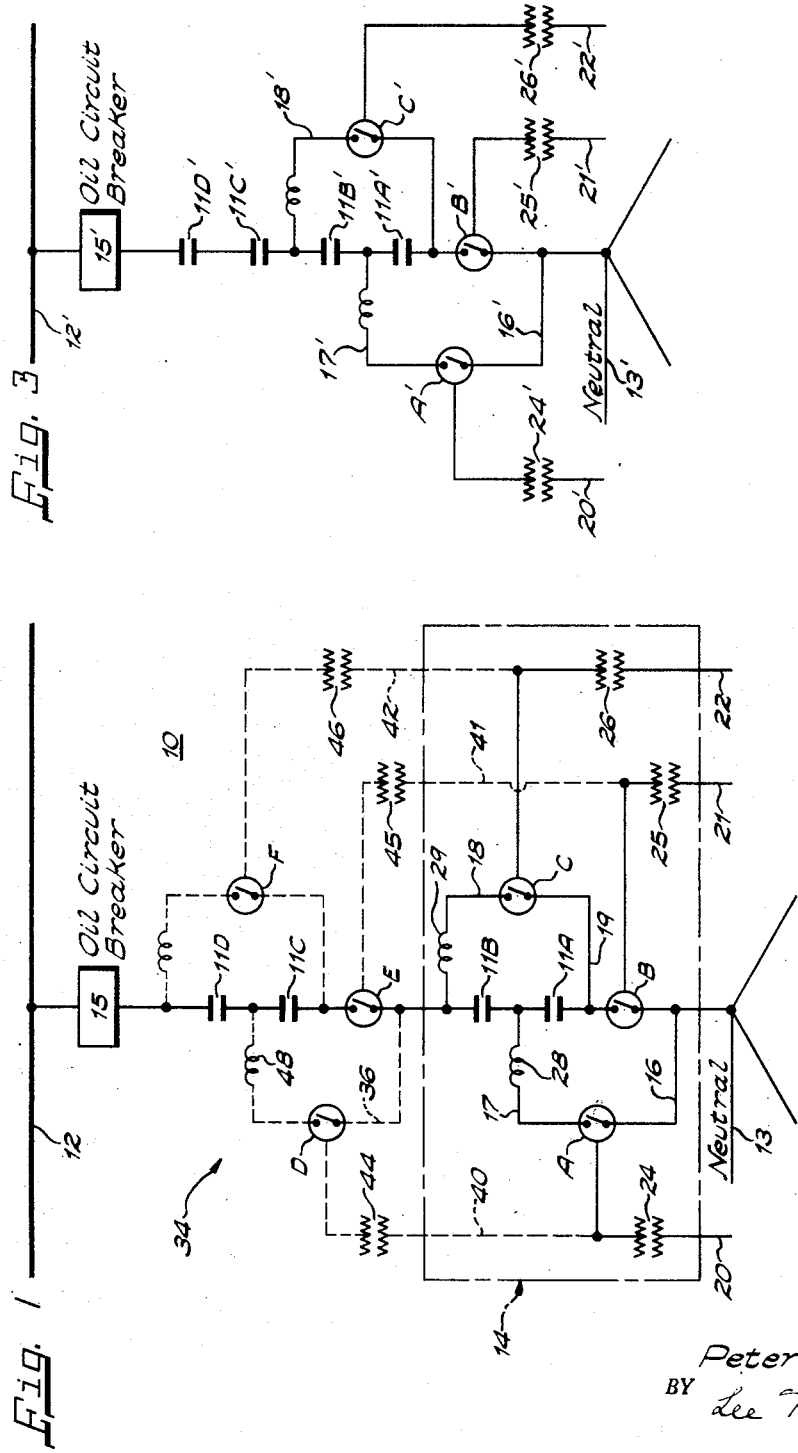

2,802,171

ARRANGEMENT FOR SWITCHING CAPACITORS

Peter M. Minder, Basel, Switzerland, assignor to McGraw-Edison Company, a corporation of Delaware Application November 10, 1955, Serial No. 546,220

7 Claims. (Cl. 323—128)

This invention relates to power capacitors for supplying reactive volt amperes to an alternating current power system and in particular to an arrangement for reconnecting power capacitors to vary the leading kilovars supplied by a capacitor bank to an alternating current power system.

Although a capacitor bank can be switched onto an alternating current power line in one step, it is general practice to provide switching so that a large capacitor bank is connected to the system in several steps as required. Changes in operating conditions of the system usually require variation in the amount of leading reactive volt amperes supplied to the system, and conventionally the total capacitive reactance of the bank is divided into a plurality of steps each of which is provided with its own circuit breaker. The circuit breaker switches at full phase to phase, or phase to neutral, voltage and, in addition, must be capable of handling short circuit currents. When a large capacitor bank is de-energized, larger than normal system voltages may exist across the circuit breaker contacts because of the trapped charge on the capacitors and thus impose a greater than normal task on the circuit breaker dielectric.

It is an object of the invention to provide an arrangement for varying the reactive kilovars supplied by a capacitor bank to an alternating current power system which obviates the necessity of an expensive circuit breaker for each change in kilovars supplied to the system.

It is a further object of this invention to provide an arrangement for reconnecting capacitors to vary the kilovar output of a capacitor bank which permits switching of the capacitors at voltages which are only a fraction of the phase to phase, or phase to neutral, voltage.

Power capacitors are used only to a very limited extent to supply the necessary reactive volt amperes in the event of a fault on an alternating current power system due to the inherent characteristic of a static condenser to automatically reduce its kilovar output at the very moment when it is most needed, i. e., upon a drop in system voltage. Further, a power capacitor automatically increases its kilovar output at the very time when such output is a detriment to the system, i. e., upon an increase in system voltage. Traditionally, synchronous condensers have been used instead of static capacitors for supplying reactive volt amperes to a fault even though the losses of synchronous condensers are many times higher than the losses of equivalent kva. power capacitors and the cost of synchronous condensers are greater than the cost of equivalent kva. power capacitors. Notwithstanding the much greater operating and maintenance cost of the synchronous condenser and its occasional prolonged outage for repairs, the synchronous condenser is preferred to static capacitors largely because of its inherent ability to increase the leading kilovars supplied to the system upon the occurrence of a fault of sufficient severity to materially lower the system voltage.

It is a still further object of the invention to provide an arrangement whereby static capacitors are satisfactorily employed for regulating system voltage, which capacitors are adapted to have their impressed voltage increased upon a decrease in system voltage from normal as a result of a system fault.

Another object of the invention is to provide an improved arrangement for increasing the kilovar output of a capacitor bank to effect stability of an alternating current power system in emergencies.

A still further object is to provide an improved arrangement for operating capacitors at overvoltage to increase the leading reactive volt amperes supplied to an alternating current power system.

The ability of a capacitor to withstand short-time overvoltages and thus increase its kilovar output can be used advantageously both for short-time comparatively large kilovar increase for system stability in emergencies and for a longer-time comparatively small kilovar increase for intermittent extreme-voltage or power factor improvement.

For a fuller understanding of the nature and objects of the invention, reference should be had to the following detailed description when taken in connection with the accompanying drawing wherein:

Fig. 1 is a schematic circuit diagram of an arrangement in accordance with the invention for reconnecting capacitors to vary the reactive volt ampere output thereof in "steps," only one phase being illustrated;

Fig. 2 is a chart showing the position of the switches of Fig. 1 in order to effect the variation of kilovar output in "steps"; and Fig. 3 is a schematic circuit diagram of an arrangement in accordance with the invention especially adapted to provide power system stability in emergencies, only one phase being illustrated.

The invention is only applicable to multiseries capacitor banks wherein a plurality of serially arranged capacitors, or groups of paralleled capacitors, are connected in shunt to an alternating current power system. The invention may be utilized in either a single phase or a polyphase power system with either a Y or delta connected capacitor bank. Only a single phase 10 of a capacitor bank arranged to be switched in accordance with the invention onto an alternating current power line in a plurality of "steps" is illustrated in Fig. 1 wherein four series groups 11A, 11B, 11C and 11D are connected in series and this serial arrangement is connected in shunt between phase conductor 12 and the neutral 13. It will be appreciated that the symbol for each series group 11 may represent either a single capacitor unit or a plurality of capacitor units connected in parallel, and further the term "capacitor" as used in this description and the appended claims is intended to cover both a group of paralleled individual capacitor units as well as a single unit. Further the conductors 12 and 13 may be the lines of a single phase alternating current power system. In the arrangement illustrated in Fig. 1 twice as many series groups 11 are connected in series as in a conventional capacitor bank. In other words, with the four series groups 11A, 11B, 11C and 11D connected in series across the phase to neutral potential, only one-half rated voltage is impressed across the capacitors of each series groups 11A, 11B, 11C and 11D. Consequently the reactive volt amperes supplied by the capacitors of series groups 11A, 11B, 11C and 11D is only one-fourth their rated kilovar output. Two inexpensive capacitor switches B and E are connected in series with the groups 11A, 11B, 11C and 11D.

In a conventional capacitor bank each step involves the switching of additional capacitors onto the power system. In the arrangement of the invention shown in Fig. 1, the series groups 11A, 11B, 11C, and 11D are reconnected to provide additional kilovar output from phase 10 of the capacitor bank in a series of operations, termed "steps." Inasmuch as the reconnection of the series groups 11A, 11B, 11C and 11D is accomplished at potentials which are only a fraction of the phase to phase, or phase to neutral voltage, inexpensive capacitor switches A—F having relatively low voltage insulation are utilized. The capacitor switches A—F need only be insulated for the highest voltage which they interrupt and close in on. Commercially available capacitor switches conventionally have insulation of the 15 kilovolt class and are satisfactory, although in many installations switches having a lower insulation level would be satisfactory if they were commercially available. Several suitable capacitor switches adapted to be actuated either mechanically or by electrical control signals from a remote location are commercially available, one switch suitable for this invention being disclosed in U. S. Patent 2,671,141 to William J. Weinfurt, having the same assignee as the subject invention, and in order to simplify the drawing and facilitate the understanding of the invention the details of the switches A—F and the control wiring therefor have been omitted from the drawing and it is schematically represented that each switch A—F is actuated between open and closed positions by electrical control signals over a single lead.

In accordance with the invention, switching of the capacitor bank in "steps" is accomplished by reconnecting the series groups of a basic unit, connoted a "series combination" comprising two adjacent series groups and three inexpensive capacitor switches. All of the series combinations are substantially identical and only one will be described in detail. Series combination 14 includes the two electrically adjacent series groups 11A and 11B and three switches A, B and C illustrated within the dot-dash rectangle, the group 11A being connected directly to switch B. Preferably the capacitors of both series groups 11A and 11B and the switches A, B and C are supported upon electrically common mounting frames raised, if necessary, to an insulation level above ground. With switches B and E closed, the first "step" of the capacitor bank is switched in shunt to the alternating current power system by actuating oil circuit breaker 15 to closed position, thereby connecting the serial arrangement of the groups 11A—11D and the switches B and E across phase conductor 12 and the neutral 13. In order to increase the kilovar output and provide the second "step" of the capacitor bank, one series group of each series combination is short-circuited, thereby doubling the voltage impressed upon the unshorted group of the series combination and quadrupling its kilovar output. In this position rated voltage is impressed upon the unshorted series group and the reactive volt ampere output of the series combination is only one-half its rated kilovars. In order to further increase the kilovar output and provide a third step, the two series groups of each series combination are reconnected in parallel so that rated voltage is applied to all capacitors. Consequently, the reactive volt ampere output of each series combination is four times greater than that of the first step and equal to the rated kilovars of the series groups.

As explained hereinbefore, with oil circuit breaker and switches B and E closed, only one-half rated voltage is impressed across each of the serially connected groups 11A and 11B of series combination 14. A second capacitor switch A, similar to the switch B, is connected by conductor 16 to the neutral 13 and also connected by conductor 17 to the junction between series groups 11A and 11B. A third capacitor switch C is connected by conductor 18 to the junction between series group 11B and switch E and also connected by conductor 19 to the junction between series group 11A and switch B.

In order to reconnect series groups 11A and 11B to provide the second "step," a control signal is supplied over control lead 20 to actuate switch A to closed position. It is schematically represented in Fig. 1 that switches A, B and C are operated between open and closed positions by control signals over control leads 20, 21 and 22 respectively. If the neutral of the capacitor bank is floating and if the casings of the switches A, B and C are not grounded, the control signals for the switches A, B and C should be supplied through the insulating transformers 24, 25 and 26 respectively. Preferably the insulating transformers 24, 25 and 26 have a 1 to 1 ratio and insulation between the windings having a rating at least equal to the highest voltage which will be impressed across the transformers. Commercially available transformers suitable for this purpose have insulation of the 15 kilovolt class. On capacitor banks with a floating neutral it is common practise to provide insulation between neutral and ground of a rating higher than phase-to-neutral voltage to provide for shift of the neutral. If a voltage higher than 15 kilovolts may be impressed across insulating transformers 24, 25 and 26 as a result of shift of the neutral, it may be desirable to cascade insulating transformers of the 15 kilovolt class. If the design of switches A, B and C is such that one control signal is supplied to actuate the switch to open position and a second control signal is supplied over a separate lead to operate the switch to closed position, two insulating transformers may be required for each switch A, B and C.

Closure of switch A short circuits series group 11A and switch B, thereby impressing rated voltage across series group 11B. Inasmuch as the kilovar output of a capacitor increases as the square of the applied voltage, doubling the voltage applied to series group 11B quadruples its reactive volt ampere and consequently the kilovar output of series combination 14 is doubled even though one series group 11A thereof is short-circuited. Switch A in closing short circuits series group 11A at only half rated voltage which is only a fraction of the phase to neutral potential. If desired, a current limiting reactor 28 may be connected in lead 17 to limit the current upon closure of switch A.

In order to provide the third "step," the two groups 11A and 11B of series combination 14 are reconnected in parallel. Switch B is first actuated to open position by a control signal over control lead 21 to disconnect series group 11A from the neutral 13, and subsequently switch C is actuated to closed position by a control signal over control lead 22 to reconnect series group 11A to the junction of switch E and series group 11B. Inasmuch as when switch B is open and switches A and C are closed, the neutral 13 is connected by switch A to the juncture of groups 11A and 11B and switch C connects group 11A to switch E, the groups 11A and 11B are connected in parallel and the reactive volt ampere output of the series combination 14 is double the number of kilovars provided in "step" two when switch C is open. In step three the series groups 11A and 11B provide rated kilovar to the power system. Switch B opens and closes under no current conditions. Switch C in closing connects series group 11A in parallel with series group 11B, which is energized at rated potential, but even this switching is at only a fraction of phase to neutral voltage. If desired, a current limiting reactor 29 may be connected in lead 18 to limit the current upon closure of switch C.

Fig. 2 is a chart showing the position of the switches A, B and C to vary the kilovar output of series combination 14 in "steps." In summary, when oil circuit breaker 15 is closed the first step of the capacitor bank is switched in shunt to the power system. To reconnect the series groups for the second step, switch A is closed to double the reactive volt amperes supplied to the bank in the first step. On the third step switch B is opened and subsequently switch C is closed to provide four times the number of kilovars supplied in the first step, i. e., to provide rated kilovar output.

The desired sequence to increase the kilovar output of series combination 14 in "steps" is:

Step 1—Close breaker 15
Step 2—Close switch A
Step 3—{Open switch B
{Close switch C The reverse sequence of switching is followed in order to decrease the kilovar output of the series combination 14 in "steps," namely:

Step 3—{Open switch C
{Close switch B
Step 2—Open switch A
Step 1—Open breaker 15

Series groups 11C and 11D and switches D, E and F may comprise a series combination 34 switched in a manner identical to that described for series group 14, and it is schematically represented in Fig. 1 that series groups 11C and 11D are switched substantially simultaneously with groups 11A and 11B by control signals over the control leads 20, 21 and 22. With switches B and E closed, the first step of capacitors of both series combinations 14 and 34 is switched onto the power system by closure of oil circuit breaker 15 to connect the series groups 11A, 11B, 11C and 11D in series between phase conductor 12 and neutral 13 and energize the capacitors of the series groups at half their rated voltage. The second "step" of the capacitor bank, i. e., of both series combinations 14 and 34, is switched by applying a control signal to control lead 20 to operate switches A and D substantially simultaneously. The control signal is transmitted to switch D over lead 40 shown in dotted lines and raised to the potential level of the series group 11C by an insulating transformer 44 similar to transformer 24. Operation of switches A and D short circuits series groups 11A and 11C respectively, thereby impressing rated voltage across unshorted series groups 11B and 11D and quadrupling the kilovar output of groups 11B and 11D. Consequently, the kilovar output of the capacitor bank is double that of the first "step." If desired a current limiting reactor 48 may be connected in lead 36 to limit the current upon closure of switch D. To switch the third step of the capacitor bank onto the power system, a control signal is applied to control lead 21 to open switches B and E. The control signal is transmitted to switch E over conductor 41 shown in dotted lines and raised to the potential level of series groups 11C and 11D by insulating transformer 45. A control signal is subsequently applied to control lead 22 to close switches C and F substantially simultaneously. The control signal on lead 22 is transmitted to the control portion of switch F over conductor 42 shown as a dotted line and raised by insulating transformer 46 to the potential level of the capacitors being switched. Opening of switches B and E disconnects series groups 11A and 11C from the neutral 13 and from group 11B respectively. Closure of switch C connects group 11A in parallel with group 11B, and closure of switch F connects group 11C in parallel with group 11D, thereby applying rated voltage across all the series groups 11A—11D and doubling the reactive volt amperes supplied to the system in step two.

Although the preferred embodiment of the invention has been illustrated and described as including an oil circuit breaker 15 for switching the serially connected groups 11A—11D in shunt between phase conductor 12 and neutral 13, the invention is not so limited and in alternative embodiments the oil circuit breaker can be omitted and the capacitors 11A—11D permanently connected so as to normally supply one-fourth rated kilovar to the power system.

Fig. 3 illustrates an arrangement of the invention especially effective in increasing the stability of a power system for short emergency periods. The arrangement of Fig. 3 is substantially identical to that of Fig. 1 with the exception that the number of series groups is selected so that rated voltage is normally applied to the capacitors and switches are only provided to reconnect the capacitors of two of the four series groups, i. e., to reconnect the capacitors of one series combination. While the embodiments of both Figs. 1 and 3 are illustrated and described as comprising four series groups, the invention is not so limited and comprehends any number of series groups greater than two, whether such number is odd or even, connected in shunt to a power system. The arrangement for accomplishing the reconnection of series groups 11A and 11B is substantially identical to that of Fig. 1 and identical parts have been given the same reference numerals with the addition of the prime (') designation. The number of series groups utilized in the arrangement of Fig. 3 is chosen to impress rated voltage on the groups 11A' to 11D' when they are connected in series. In other words, the potential between phase conductor 12' and neutral 13' is twice that provided between conductor 12 and neutral 13 in the arrangement shown in Fig. 1, and when oil circuit breaker 15' is closed (assuming switch B' closed) rated voltage is impressed across all of the series groups 11A'—11D'. For system stability in emergencies the switches A', B', and C' should preferably be of the solenoid operated type that are actuated rapidly between open and closed positions upon energization.

To increase the leading reactive volt amperes supplied to the power system in the event of low system voltage, series groups 11A', and 11B' are reconnected in parallel by supplying control signals sequentially over control leads 20', 21' and 22' to obtain the following switching required:

(1) Close A'
(2) Open B'
(3) Close C' which is identical to that described for the circuit of Fig. 1. The result of reconnecting groups 11A' and 11B' in parallel is to impress 1.6 times rated voltage across series groups 11C' and 11D', to impress 0.8 times rated voltage across series groups 11A' and 11B', and thus raise the reactive volt ampere output of the bank to 1.6 times rated output.

In order to again obtain rated kilovar output from the capacitor bank, control signals are supplied sequentially to control leads 22', 21' and 20' to operate the switches in the reverse sequence, namely:

(1) Open C'
(2) Close B'
(3) Open A'

It will be appreciated that the invention is also applicable to capacitor banks having only two series groups between phase conductor and neutral normally operated at rated voltage in order to provide emergency power system stability by reconnecting the two series groups in parallel and thus obtain four times rated kilovar output from the bank.

The American Institute of Electrical Engineers has made recommendations for permissible 60-cycle overvoltage operation of power capacitors for periods which will not result in damage to the capacitors, some specific values being the following:

1.8 times rated voltage for 15 seconds
1.7 times rated voltage for 1 minute
1.55 times rated voltage for 5 minutes
1.1 times rated voltage for 24 hours It will be appreciated that the reconnection of the series groups by the switches A—F is always at a potential which is only a fraction of the phase to neutral, or phase to phase, voltage. Because of the relatively low voltage at which they interrupt and close in on capacitor current, the switches A—F can be constructed with relatively low voltage insulation and at a cost which is only a minor fraction of that of an oil circuit breaker which is conventionally utilized to switch each step of a capacitor bank. Further, it wil be appreciated that the capacitor bank may be always connected in Y regardless of the magnitude of the leading kilovars supplied to the power system and therefore has all the well known advantages of a Y connected bank.

Although only a few embodiments of the invention have been illustrated and described, they are intended to be illustrative only and modifications and variations thereof will be apparent to the man skilled in the art, and it is intended in the appended claims to cover all such modifications and variations which fall within the true spirit and scope of the invention.

What I claim as new and desire to secure by Letters Patent of the United States is:

1. In an alternating current power system, in combination, two serially arranged capacitors connected between two points of potential difference in said power system and in shunt to said power system, means for short circuiting between the junction of said capacitors and one of said points, switching means for disconnecting the capacitor short-circuited by the last mentioned means from said one of said points, and switching means for reconnecting said disconnected capacitor to the second of said points.

2. In a capacitor bank for supplying reactive volt amperes to an alternating current power system, in combination, at least two serially connected groups of paralleled capacitors, means for connecting said serial arrangement of capacitor groups between two points of potential difference in said power system and in shunt to said power system, means for short-circuiting between the juncture of said groups and one of said points, switching means for disconnecting the groups short-circuited by the last mentioned means from said one of said points, and switching means for reconnecting the disconnected group to the other of said points.

3. In combination with a capacitor bank having the serial arrangement of a first electrical switch and at least two electrically adjacent groups of paralleled capacitors connected in shunt to an alternating current power line, a second electrical switch connected to the junction of said two groups and also connected to the side of said first electrical switch away from said groups, and a third electrical switch connected to the junction of said first electrical switch with one of said groups and also connected to the side of the other of said groups away from the junction of said groups.

4. In a capacitor bank including a plurality of serially arranged group of paralleled capacitors, a first electrical switch in series with said groups and connected directly to one of two electrically adjacent ones of said groups, means for connecting the serial arrangement of said groups and said first switch in shunt to an alternating current power system, a second electrical switch connected to the juncture of said two electrically adjacent groups and also connected to the side of said first switch away from said adjacent groups, and a third electrical switch connected to the juncture of said first switch with one of said electrically adjacent groups and also connected to the side of the other of said adjacent groups away from the junction of said adjacent groups.

5. An arrangement for reconnecting power capacitors to vary the voltage applied across said capacitors and the reactive volt amperes supplied by said capacitors comprising, in combination, a first electrical switch, a first capacitor connected directly to said first switch, a second capacitor connected directly to said first capacitor, a second electrical switch connected to the junction of said first and second capacitors and also connected to the side of said first switch away from said first capacitor, and a third electrical switch connected to the junction of said first switch with said first capacitor and also connected to the side of said second capacitor away from said first capacitor.

6. In a capacitor bank including a plurality of serially connected capacitors a first and a second of which are electrically adjacent, in combination, a first electrical switch connected to said first capacitor, means for connecting the serial arrangement of said capacitors and said first switch in shunt to an alternating current power line, a second electrical switch connected to the junction of said first and second capacitors and also connected to the side of said first switch away from said first capacitor, and a third electrical switch connected to the juncture of said first switch with said first capacitor and also connected to the side of said second capacitor away from said first capacitor.

7. In combination with an alternating current electrical power system, a capacitor bank including a plurality of serially connected groups of paralleled capacitors two of which groups are electrically adjacent, three electrical switches each of which is adapted to be operated between open and closed positions upon the receipt of electrical control signals, the first of said switches being normally closed and connected in series with said serially connected groups and directly to one of said electrically adjacent groups, means for connecting the serial arrangement of said groups and said first switch in shunt to said electrical power system, the second of said switches being normally open and connected to the juncture of said two adjacent groups and also connected to the side of said first switch away from said adjacent groups, the third of said switches being normally open and connected to the junction of said first switch with one of said adjacent groups and also connected to the side of the other of said adjacent groups away from the junction of said adjacent groups, and means to supply electrical control signals sequentially to said second switch, said first switch, and said third switch.

No references cited.